(12) United States Patent
Knauer

(10) Patent No.: US 10,060,483 B2
(45) Date of Patent: Aug. 28, 2018

(54) LOAD LIMITER

(71) Applicant: Decoma (Germany) GmbH, Sulzbach (DE)

(72) Inventor: Bernd Knauer, Esslingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 1066 days.

(21) Appl. No.: 13/916,720

(22) Filed: Jun. 13, 2013

(65) Prior Publication Data

US 2013/0337923 A1    Dec. 19, 2013

(51) Int. Cl.
*F16D 3/06* (2006.01)
*B60K 11/08* (2006.01)

(52) U.S. Cl.
CPC .............. *F16D 3/06* (2013.01); *B60K 11/085* (2013.01); *Y02T 10/88* (2013.01)

(58) Field of Classification Search
CPC ..... F16D 3/06; F16D 1/10; F16D 3/18; F16D 3/00; F16D 3/20; F16D 3/227; F16D 3/60; F16D 7/00; F16D 7/02; F16D 7/024; F16D 7/025; F16D 7/028; F16D 7/042; F16D 7/044; B60K 11/04; B60K 11/08; B60K 11/085
See application file for complete search history.

(56) References Cited

U.S. PATENT DOCUMENTS

| 2,561,136 A | * | 7/1951 | Richardson | ...................... 464/39 |
| 4,753,288 A | | 6/1988 | Harvey | |
| 2010/0236503 A1 | * | 9/2010 | Bernt et al. | ................. 123/41.05 |
| 2011/0226541 A1 | | 9/2011 | Asano et al. | |
| 2012/0074729 A1 | * | 3/2012 | Fenchak et al. | ........... 296/193.1 |
| 2013/0081785 A1 | * | 4/2013 | Yoo | .................................. 165/96 |

FOREIGN PATENT DOCUMENTS

| DE | 3701584 A1 | 8/1988 |
| DE | 202005010683 U1 | 9/2005 |
| DE | 602004007338 T2 | 3/2008 |
| DE | 102008049010 A1 | 4/2010 |
| DE | 102009014003 A1 | 9/2010 |
| EP | 2233341 A1 | 9/2010 |
| EP | 2233342 A1 | 9/2010 |
| EP | 2325035 A1 | 5/2011 |
| EP | 2371602 A1 | 10/2011 |
| KR | 20120050106 A | 5/2012 |

* cited by examiner

*Primary Examiner* — Jacob Amick

(74) *Attorney, Agent, or Firm* — Jordan IP Law, LLC; Todd A. Vaughn

(57) ABSTRACT

A load limiter for a controllable air inlet of a motor vehicle and which includes a drive-side driver coupled to an engine of the motor vehicle, an output-side driver configured to relay torque from the engine to closing elements of the controllable air inlet, the output-side drive having contours configured to engage corresponding contours of the drive-side driver, the drive-side driver and the output-side driver being configured for positive interlocking contact with each other and also for axial movement relative to one another in order to disengage the positive interlock; and a bias mechanism configured to pivot the output-side driver when in the disengaged state relative to the drive-side driver.

18 Claims, 3 Drawing Sheets

LOAD LIMITER

CROSS-REFERENCE TO RELATED APPLICATIONS

The present application claims priority under 35 U.S.C. § 119 to German Patent Application No. DE 10 2012 011 593.8 (filed on (Jun. 13, 2012), which is hereby incorporated by reference in its entirety.

TECHNICAL FIELD

A load limiter for a controllable air inlet of a motor vehicle.

BACKGROUND

In conventional motor vehicles, air flow to the heat exchanger is controlled by way of adjustable elements in order to enhance the warm-up behaviour of the engine. The adjustable elements, the closing elements, usually involve a plurality of pivotally supported louvres, these being arranged with their axes of rotation parallel to one another and rotatably arranged altogether in a frame. The frame with the louvre arrangement is positioned behind the radiator grille and in front of the engine heat exchanger. Such an arrangement may also be arranged in a flow duct, via which cooling air is fed from an opening arranged in the vehicle body to the heat exchanger, the engine radiator. By closing the fresh air feed during the warm-up phase and by controlling the quantity of cooling air in accordance with the engine temperature, the optimum operating temperature is reached more rapidly and can be kept within a tight temperature range.

Examples of the devices described are disclosed in EP 2 233 341 A1, EP 2 233 342 A1, EP 2 325 035 A1, DE 10 2008 049 010 A1, DE 20 2005 010 683 U1 and DE 60 2004 007 338 T2.

DE 10 2009 014 003 A1 discloses an actuator, which switches the air inlet into the open position when a pre-defined temperature is exceeded. The system described does not afford a simple, reliable opening of the air inlet. Finally, this known solution also does not comprise any safeguard against drive-side malfunctions.

SUMMARY

Embodiments are related to a controllable air inlet having an enhanced structural design compared to conventional designs and in which an output-side driver in a disengaged state is pivoted by a spring mechanism in an opening direction of closing elements.

Embodiments are related to a load limiter for a controllable air inlet of a motor vehicle, and includes at least one of: a drive-side driver coupled to an engine, and an output-side driver which relays the engine torque to closing elements of the controllable air inlet, the drivers being configured for positive interlocking contact with one another and moveably arranged in an axial direction to one another in order to release the positive interlock, and the output-side driver configured in a disengaged state to be pivoted by an associated spring mechanism in a direction relative to the drive-side driver.

In accordance with embodiments, the output-side driver in the disengaged state is pivoted by the spring mechanism in the opening direction of the closing elements. This allows the air inlet to be opened automatically through manual separation of the two drivers, the parts being disengaged from one another in an axial direction. Here a separate mechanism may be provided, which if necessary is grasped and pulled so as to disengage the two drivers. The spring mechanism arranged between the driver parts serves to pivot the output-side driver in the opening direction, opening the air inlet.

The driver parts act through positive interlock with one another, i.e., one or more contours of the drive-side driver engage in correspondingly formed structures of the output-side driver. These contours are designed to ensure that the rotational movement is thereby transmitted up to a pre-defined torque. If the torque is exceeded, the force acting axially on the drivers causes these to be displaced relative to one another, that is to say disengaged. The device thereby has a torque-limiting action, that is to say an automatic disengagement ensues if the drive torque is interrupted or if the closing elements jam.

In accordance with embodiments, the spring mechanism arranged between the drivers is embodied as a torsion spring, which is braced with one leg on each of the drivers. Here the torsion is pre-tensioned in such a way that on axial disengagement of the drivers the output-side driver is rotated in the opening direction of the closing elements.

Embodiments are related to a load limiter for a controllable air inlet of a motor vehicle that includes at least one of: a drive-side driver coupled to an engine of the motor vehicle; an output-side driver configured to relay torque from the engine to closing elements of the controllable air inlet, the output-side drive having contours configured to engage corresponding contours of the drive-side driver, wherein the drive-side driver and the output-side driver are configured for positive interlocking contact with each other and also for axial movement relative to one another in order to disengage the positive interlock; and a bias mechanism configured to pivot the output-side driver when in the disengaged state relative to the drive-side driver.

Embodiments are related to an apparatus that includes at least one of: a first driver operatively connected to an engine of a motor vehicle, the first driver having at a central portion thereof a pin; a second driver operatively connected to closing elements of a controllable air inlet for a heat exchanger of the motor vehicle, the second driver having a socket into which is received the pin of the first driver to form an axial guide, wherein the first driver and the second driver are configured for movement between a first position in which the first driver and the second driver positively interlocked to each other and a second position in which the positive interlock between the first driver and the second driver is axially disengaged; and a bias mechanism provided axially on the pin of the first driver, the bias mechanism having a first leg on the first driver and a second leg on the second driver and configured such that in the second position the second driver is pivoted or otherwise movably displaced.

Embodiments are related to an apparatus that includes at least one of: a first driver operatively connected to an engine of a motor vehicle; a second driver operatively connected to closing elements of a controllable air inlet for a heat exchanger of the motor vehicle and configured for movement between a first position to form a positive interlock with the first driver and a second position in which the positive interlock between is axially disengaged; and a bias mechanism configured such that in the second position the second driver is pivoted or otherwise movably displaced.

DRAWINGS

Embodiments are described by way of example below with reference to the drawings.

DESCRIPTION

Figure 1:
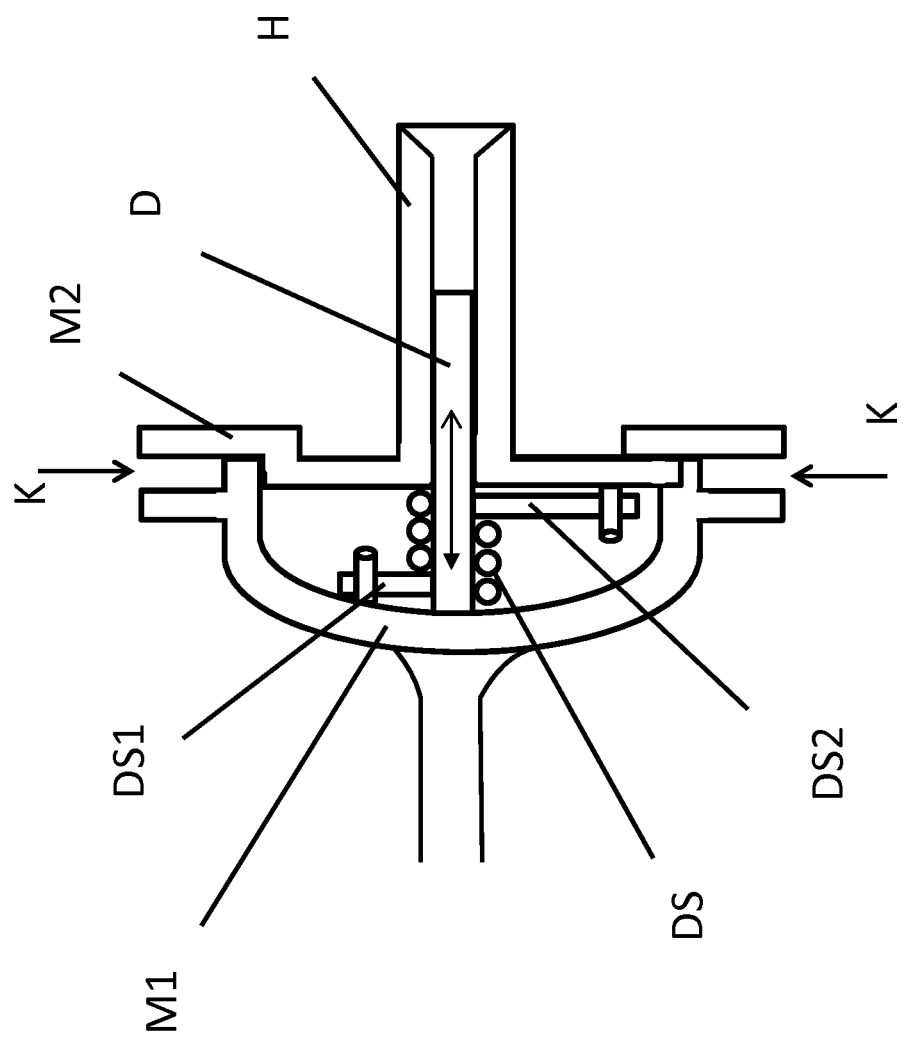
FIG. 1 illustrates a sectional view of a load limiter in accordance with embodiments.

FIG. 1 illustrates a sectional view of a load limiter in accordance with embodiments. A drive-side driver M1 connected to an engine (not illustrated) is of a bell-shaped design (embodiments are not limited to such a shape) and includes at a central portion thereof a pin D. The pin D sinks axially into a sleeve-shaped socket H of an output-side driver M2, which in turn is operatively connected by way of transmission elements (not illustrated) to one or more closing elements of a controllable air inlet. The driver parts M1, M2 operatively interact through a positive interlock with one another in their common edge area.

Figure 3:
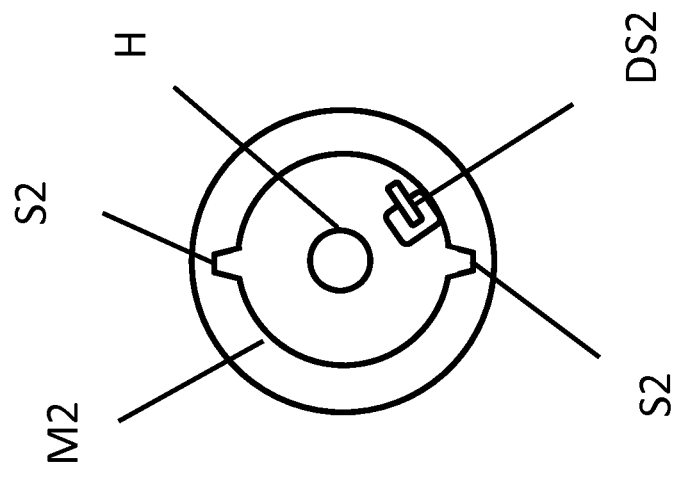
FIG. 3 illustrates an output-side driver of a load limiter in accordance with embodiments.
Figure 2:
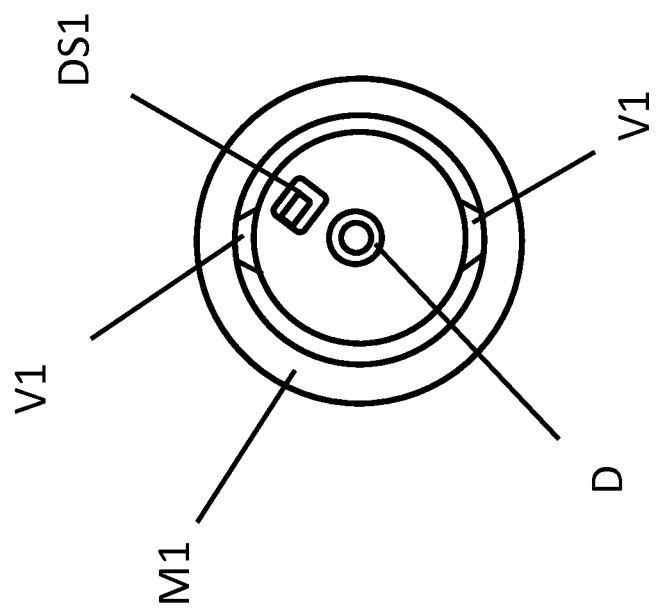
FIG. 2 illustrates a drive-side driver of a load limiter in accordance with embodiments.

As illustrated in FIGS. 2 and 3, for this purpose, the edge of the output-side driver M2 comprises studs S2 oriented in a radial direction, and which engage in two groove-like recesses V1 in the drive-side driver M1. The pin D of the driver M1 which is received into the socket H of the output-side driver M2 affords axial guidance and radial fixing of the drivers M1, M2 relative to one another. The pin D also allows an axial disengagement of the drivers M1, M2, in the event of an externally impressed force K, which axially displaces the drivers M1, M2 relative to one another in the event an excessive transmission torque, e.g., if an excessive torque is transmitted via the contours V1, S2 interacting through positive interlock with one another. The torque limit, at which the coupling formed by the drivers M1, V1, M2, S2 separates, can be designed in through suitable configuration of the interacting contours V1, S2, in particular through the angle of inclination of interacting surfaces.

A torsion spring DS is provided axially onto the pin D of the drive-side driver M1. This torsion spring DS is braced with one of its legs DS1, DS2 on each of the drivers M1, M2 and is pre-tensioned in such a way that on axial separation of the drivers M1, M2, the output-side driver M2 is pivoted or otherwise movably displaced in the opening direction of the coupled closing elements. The legs DS1, DS2 braced on the drivers M1, M2 are represented in FIGS. 2 and 3, which in each case show a top view of the drive- and output-side drivers M1, M2.

Figure 5:
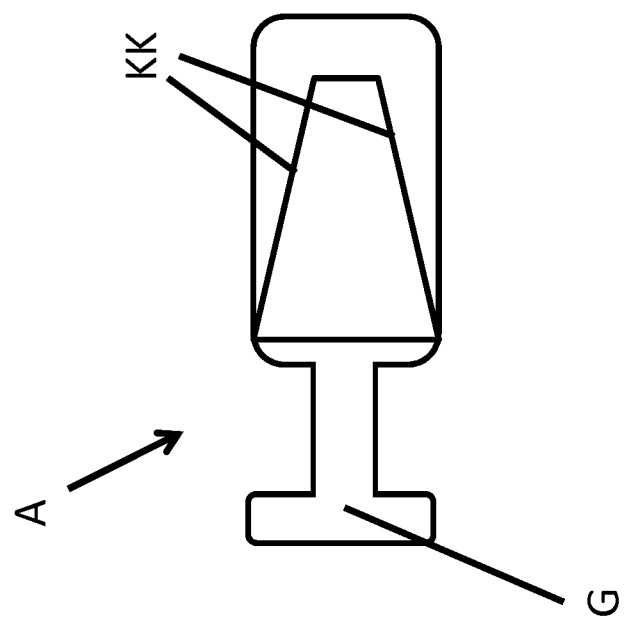
FIG. 5 illustrates a puller of a load limiter in accordance with embodiments.
Figure 4:
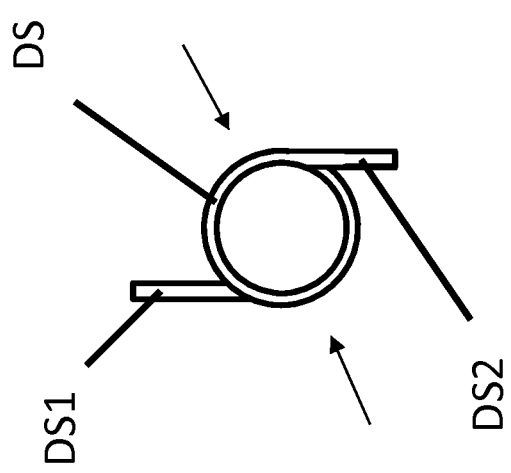
FIG. 4 illustrates a spring mechanism of a load limiter in accordance with embodiments.

FIG. 4 illustrates the torsion spring DS with its legs DS1, DS2 while FIG. 5 illustrates a puller A having a grip G. The puller A has contours KK extending at an acute angle to one another. The puller A is seated with the contours KK between the drivers M1, M2, and if necessary, for example, in the event of a high engine temperature and the closing elements of the controllable air inlet fail to open, is pulled in a radial direction. The two wedge-shaped contours now act, like the forces K represented in FIG. 1, on the drivers M1, M2 and separate the coupling formed by these parts.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

M1 drive-side driver
M2 output-side driver
V1 recess
S2 stud
D pin
H sleeve-shaped socket
DS torsion spring
DS1 leg, torsion spring, bracing driver M1
DS2 leg, torsion spring, bracing driver M2
K force
A puller
G grip
KK conical contour

What is claimed is:

1. A load limiter for a controllable air inlet of a motor vehicle, the load limiter comprising:
   a drive-side driver coupled to an engine of the motor vehicle, and which includes a pin at a central portion thereof;
   an output-side driver configured to relay torque from the engine to closing elements of the controllable air inlet, the output-side driver having contours configured to engage corresponding contours of the drive-side driver, wherein the drive-side driver and the output-side driver are configured for positive interlocking contact with each other and also for axial movement relative to one another in order to disengage the positive interlock;
   a bias mechanism configured to pivot the output-side driver when in the disengaged state relative to the drive-side driver; and
   a puller provided between the drive-side driver and the output-side driver and configured to axially separate the drive-side driver and the output-side driver.

2. The load limiter of claim 1, wherein the bias mechanism comprises a spring.

3. The load limiter of claim 2, wherein the spring comprises a torsion spring.

4. The load limiter of claim 3, wherein the output-side driver comprises a socket.

5. The load limiter of claim 4, wherein the pin is axially received in the socket to form an axial guide.

6. The load limiter of claim 5, wherein the torsion spring is seated on the pin.

7. The load limiter of claim 3, wherein the output-side driver comprises a pin.

8. The load limiter of claim 7, wherein the drive-side driver comprises a socket.

9. The load limiter of claim 8, wherein the pin is axially received in the socket to form an axial guide.

10. The load limiter of claim 9, wherein the torsion spring is seated on the pin.

11. The load limiter of claim 1, wherein the drive-side driver comprises studs extending radially and which interact with corresponding recesses of the output-side driver.

12. The load limiter of claim 1, wherein the output-side driver comprises studs which extend radially and which interact with corresponding recesses of the drive-side driver.

13. An apparatus, comprising:
- a first driver operatively connected to an engine of a motor vehicle, the first driver having at a central portion thereof a pin;
- a second driver operatively connected to closing elements of a controllable air inlet for a heat exchanger of the motor vehicle, the second driver having a socket into which is received the pin of the first driver to form an axial guide, wherein the first driver and the second driver are configured for movement between a first position in which the first driver and the second driver positively interlocked to each other and a second position in which the positive interlock between the first driver and the second driver is axially disengaged;
- a bias mechanism provided axially on the pin of the first driver, the bias mechanism having a first leg on the first driver and a second leg on the second driver and configured such that in the second position the second driver is pivoted or otherwise movably displaced; and
- a puller provided between the first driver and the second driver and configured to axially separate the first driver and the second driver.

14. The apparatus of claim 13, wherein the first driver comprises recesses and an edge of the second driver comprises studs extending radially direction and which each engage in a corresponding recess of the first driver.

15. The apparatus of claim 13, wherein the pin permits the axial disengagement of the first driver and the second driver in the event of a transmission torque transmitted to the first driver and the second driver that exceeds a predetermined torque limit.

16. The apparatus of claim 13, wherein the device is configured to axially separate the first driver and the second driver in the event the closing elements of the controllable air inlet fail to open.

17. The apparatus of claim 13, wherein the bias mechanism comprises a torsion spring.

18. An apparatus, comprising:
- a first driver operatively connected to an engine of a motor vehicle, and which includes a pin at a central portion thereof;
- a second driver operatively connected to closing elements of a controllable air inlet for a heat exchanger of the motor vehicle and configured for movement between a first position to form a positive interlock with the first driver and a second position in which the positive interlock between is axially disengaged;
- a bias mechanism configured such that in the second position the second driver is pivoted or otherwise movably displaced; and
- a puller provided between the first driver and the second driver and configured to axially separate the first driver and the second driver.

* * * * *